Patented Sept. 9, 1930

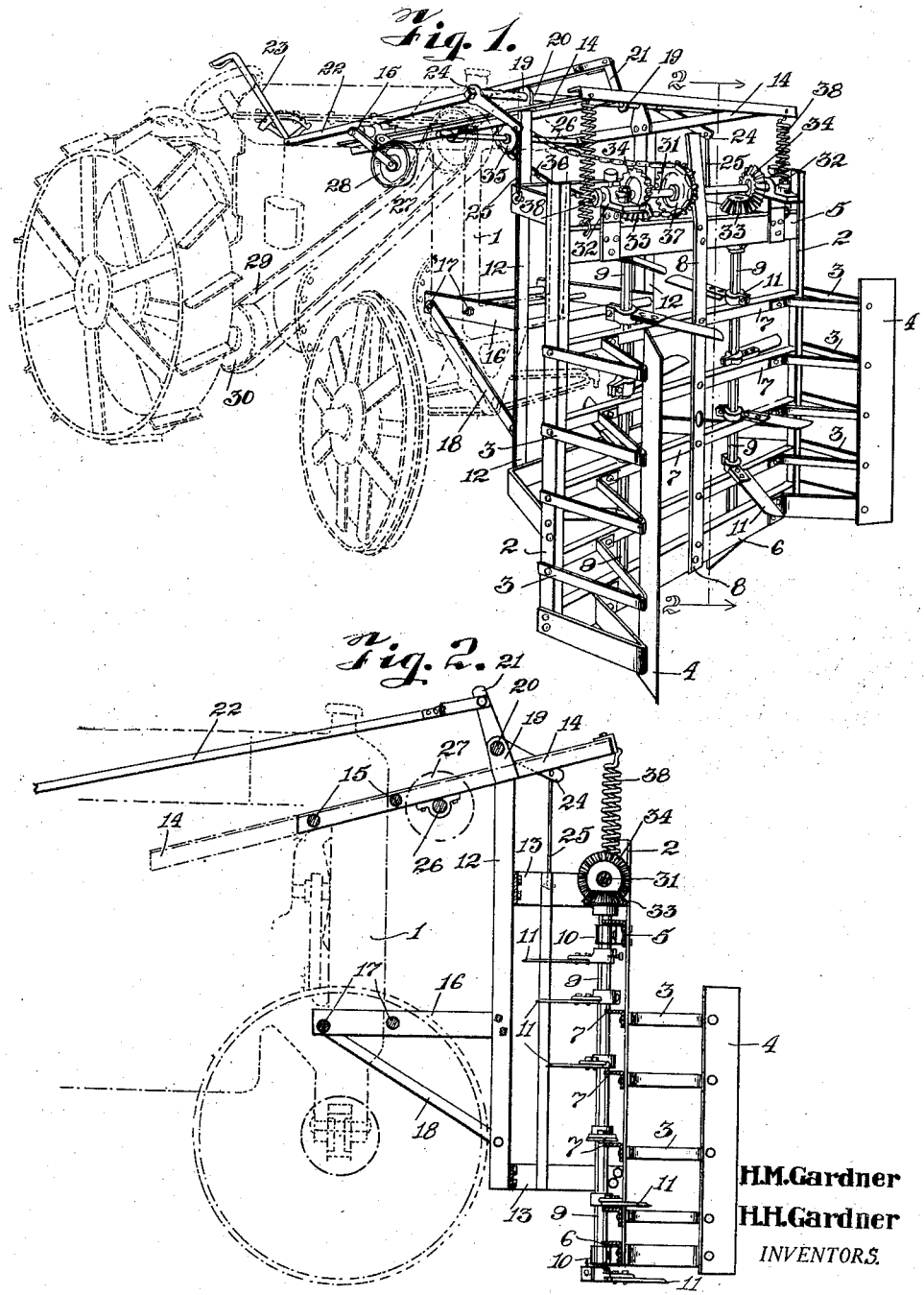

1,775,520

UNITED STATES PATENT OFFICE

HUGH H. GARDNER AND HENRY M. GARDNER, OF DALLAS, TEXAS

STALK CUTTER

Application filed August 8, 1927, Serial No. 211,562. Renewed October 26, 1929.

This invention relates to stalk cutting machines and more particularly to the type of machine for cutting stalks into a plurality of short sections, by which they may be readily turned by a plow, and the principal object of the invention resides in the provision of an improved cutter of the character specified in which a multiplicity of knives are arranged on a horizontal plane on a vertical rotating shaft, and adapted to rotate successively against a vertically disposed guard or baffle.

Still another and important object of the invention resides in the provision of an improved machine for cutting stalks having novel mechanical expediences by which to connect the same to tractors of different makes, and so arranged when so applied as to enable it to be moved over the field in advance of the tractor, thus affording better access to the stalk, than is possible in cases where the means of draft precedes the cutter, since the horses or tractor, as the case may be, very likely bears the stalks down, rendering it difficult to cut them.

A further object of the invention resides in the provision of means operable from the driver's seat on the tractor for raising and lowering the frame and cutters with respect to the ground.

In consequence of the novel association of parts of which the invention is composed, another advantage is made possible by which the established manner of cutting stalks is improved, especially by reason of its connection to the front end of the tractor, which enables the operator to both cut the stalks and plow them under at the same time.

With the foregoing objects as primary, other and lesser objects will become apparent as the description proceeds, taken in connection with the accompanying drawings, wherein;

Figure 1 represents a perspective view of a stalk cutting machine constructed according to the present invention, and illustrating its connection to a tractor, which latter is suggested in dotted lines, and Figure 2 is a side elevational view, on lines 2—2 of Figure 1, parts being shown in cross-section.

Continuing now more in detail with the drawings, the character 1 designates the tractor radiator shown in dotted lines in both Figure 1 and Figure 2. The frame of the invention is composed of two vertical side members 2, of preferably angle iron as shown, to which a series of V-shaped brackets 3 are affixed in spaced relationship. These brackets extend forwardly of the members 2 and support vertically the wings on baffles 4, against which the stalks are urged as the machine progresses.

In support of the members 2, upper and lower angle irons 5 and 6 respectively are provided, and between which in spaced horizontal relationship are mounted smaller angle irons 7, centrally braced by a vertical strip 8. See Figure 1.

An equal distance from either side of the frame described, shafts 9 are mounted in bearings 10, as particularly shown in Figure 2. Spaced in equi-distant relationship along the length of these shafts are cutter knives 11, and staggeringly arranged so that when the shafts 9 are rotated, the knives 11 will pass a predetermined point on the frame in successive order. The shafts 9, however, are made to rotate in opposite directions, and reference will be later made to this operation.

The frame supporting the shafts and associated elements is held relative to the tractor by a series of braces, composed of uprights 12, connected with the frame by upper and lower bent strips 13, and the uprights 12 are in turn supported by angle iron braces 14, extending at an angle across the tractor radiator 1 and joined together by lateral rods 15, both behind and in front of the radiator, as shown in Figure 2 especially. An intermediate brace 16 is bolted to the frame at a point spaced from the bottom thereof and is secured by bolts 17 to the bottom of the radiator 1 in a manner similar to that in applying the upper braces 14. In further support of the frame, an angularly disposed strip 18 extends from the inner bolt 16 downward to where it is bolted near the bottom of the upright members 12.

Attached to the angular top braces 14 are bearings 19 in which operates a lateral shaft 20. In this shaft is rigidly connected an arm 21, to which in turn is pivoted a link 22, extending to a hand lever 23. Also rigidly secured to the shaft 20 is an arm 24, to which is connected a depending link 25, the other end of which is attached to the upper bent strip 13. Obviously, by reason of the arrangement described, actuation of the lever 23 will raise and lower the frame with respect to the ground to adjust the same to irregularities in the ground level.

As apparent in the drawings, one of the braces 14 is of greater length than the other and carries, intermediate the frame and radiator 1 a lateral shaft 26, upon which is mounted a pulley 27. An idler pulley 28 is mounted upon the inner shaft 15 and engages a drive belt 29, shown in dotted lines in Figure 1, as surrounding the drive pulley 30 of the tractor. The elements shown in dotted lines are not claimed herein as a part of the invention proper.

Returning again to the cutter shafts and the means of transmitting rotative motion thereto; this latter means is composed of a lateral shaft 31, mounted in raised bearings 32, carried upon the upper angle iron 5 of which the frame is composed. Beveled gears 33 are mounted upon the upper ends of the cutter shafts 9, which are enmeshed by similar gears 34 carried upon the lateral shaft 31. Rotation is imparted to the shaft 31 through a chain and sprocket mechanism composed of a small sprocket 35 mounted upon the drive shaft 26, a chain 36 and sprocket 37 carried also upon the lateral shaft 31. See Figure 1.

The opposed position of the beveled gears 33 and 34 is such as to impart relative opposed rotation of the cutter shafts 9, consequently the cutter blades 11 constantly rotate in the direction of the glands 4.

Accordingly, and in operation, the invention being properly mounted upon the tractor as described and shown, the latter is guided along the rows of stalks so that the machine will be in a position to receive opposing stalks of two rows as the tractor approaches them. Should they be leaning to one side, the guards 4 will receive and move them to a position to be struck by the lowest knife, for example; and in turn by each succeeding knife until the stalk has been severed into a multiplicity of sections. In event the stalk has fallen upon the ground, the lowest knife will lift the same into position to be engaged by the guards 4, and companion knives.

From the foregoing, the effectiveness of the cutter is obvious, its thoroughness of operation being considerably increased by the relationship of the guards 4 and by reason of which it is difficult for a stalk to escape the action of the knives 11, and enables the latter to more completely disintegrate the stalk.

In old types of cutters, especially those drawn behind a means of draft, the stalk is beaten down and is consequently inaccessible to the cutter, therefore the latter is unable to properly demonstrate its effectiveness in cutting up the stalk so that it can be successfully turned under by the plows, which, in general practice, are applied after cutting of the stalks, due to the absence of some means, such as provided by the invention, for accomplishing this in a single operation.

Means heretofore provided for securing a plow to the tractor may be used in the present case for drawing the plow along behind the tractor as the same is used for operating the described invention, and no difficulty is had in turning under the stalk sections, since they are previously divided into short sections by the action of the knives in order.

The frame supporting the cutter knives is shown as being yieldably swung by springs 38 to the forwardly protruding ends of the angularly disposed braces 14, to allow for a limited amount of resiliency, but this feature of construction may be slightly altered, as well as certain other features therein, since it is not desired that the invention be limited to the specific mechanical arrangement shown and described, and that changes may be made therein from time to time as may be considered within the scope and meaning of the appended claims therefor.

We claim:

1. A stalk cutting attachment for tractors including a vertical main frame formed to be disposed in front of the tractor radiator and in spaced relation thereto, a vertically slidable frame carried by the main frame, stalk cutting means carried by the vertically slidable frame, a horizontal shaft at the top of the vertically slidable frame, means to actuate the stalk cutting means from said shaft, rearwardly projecting members carried by the main frame and formed to engage opposite sides of the tractor radiator, a shaft carried by certain of said members, means operable by a moving part of the tractor to actuate said last named shaft, means to operate the first named shaft from the last named shaft, means engaging the front and rear sides of the radiator to connect said members to the radiator, and means to operate the vertically movable frame from the tractor so as to vertically adjust said cutting means relative to the surface of the ground.

2. A stalk cutting attachment for tractors, including a frame, means carried by the frame and formed to engage the tractor to support said frame from the tractor, a vertically movable frame carried by the first frame, stalk cutting means carried by the vertically movable frame, means operable by a moving part of the tractor for actuating said stalk cutting means, and means formed to be operated from the tractor for effecting vertical adjustments of the vertically movable frame.

3. A stalk cutting attachment for tractors, including a frame, means carried by the frame and formed for connection with the tractor to support said frame from the tractor, a vertically movable frame carried by the first frame, stalk cutting means carried by the vertically movable frame, spring means for yieldably supporting the vertically movable frame relative to the first named frame, means operable by a moving part of the tractor for actuating said stalk cutting means, and means formed to be operated from the tractor and connected to the vertically movable frame for effecting vertical adjustments of the latter.

4. A stalk cutting attachment for tractors, including a frame, means carried by the frame and formed for connection with the tractor to support said frame from the tractor, stalk cutting means carried by said frame, means on the frame to operate said stalk cutting means, and means to actuate said cutter operating means from a moving part of the tractor.

5. A stalk cutting attachment for tractors, including a frame, means carried by the frame and formed for connection with the tractor to support the frame from the tractor, stalk cutting means carried by the frame, means to actuate the stalk cutting means including a shaft, a second shaft carried by said supporting means, means to drive the first named shaft from the second named one, and means to actuate said second named shaft by a moving part of the tractor.

6. A stalk cutting attachment for tractors, including a frame, means carried by the frame and formed for connection with the tractor to support said frame therefrom, a vertically movable frame carried by the first frame, stalk cutting means carried by the vertically movable frame, means to vertically adjust said vertically movable frame relative to the surface of the ground, and means operable by a moving part of the tractor for actuating said stalk cutting means.

7. A stalk cutting attachment for tractors, including a vertical frame formed to be disposed in front of the tractor radiator, stalk cutting means carried by the frame, rearwardly projecting members carried by the frame and formed to be disposed on opposite sides of the tractor radiator, lateral rods connected to said members and formed to be disposed rearwardly of and in front of the radiator and to engage same, thereby to rigidly support the frame from the tractor, and means operable by a moving part of the tractor to actuate said stalk cutting means.

In testimony whereof we affix our signatures.

HENRY M. GARDNER.
HUGH H. GARDNER.